United States Patent
Shapira et al.

(10) Patent No.: US 9,584,201 B2
(45) Date of Patent: Feb. 28, 2017

(54) SU-MIMO, MU-MIMO AND BEAMFORMING OPERATIONS USING SYNCHRONIZED WLAN DEVICES

(71) Applicant: Celeno Communications (Israel) Ltd., Raanana (IL)

(72) Inventors: Nir Shapira, Raanana (IL); Gregory Lerner, Petach-Tikva (IL)

(73) Assignee: CELENO COMMUNICATIONS (ISRAEL) LTD., Ra'anana (IL)

( * ) Notice: Subject to any disclaimer, the term of this patent is extended or adjusted under 35 U.S.C. 154(b) by 0 days.

(21) Appl. No.: 14/957,628

(22) Filed: Dec. 3, 2015

(65) Prior Publication Data

US 2016/0164594 A1 Jun. 9, 2016

Related U.S. Application Data

(60) Provisional application No. 62/089,267, filed on Dec. 9, 2014.

(51) Int. Cl.
  *H04B 7/02* (2006.01)
  *H04B 7/04* (2006.01)
  *H04B 7/06* (2006.01)

(52) U.S. Cl.
  CPC ......... *H04B 7/0452* (2013.01); *H04B 7/0617* (2013.01)

(58) Field of Classification Search
  CPC ... H04W 84/12; H04B 1/0003; H04B 7/0413; H04B 7/0452; H04B 7/086; H04B 7/0874; H04M 2250/02
  USPC ........ 375/267, 347, 260, 299, 366; 455/101, 455/103
  See application file for complete search history.

(56) References Cited

U.S. PATENT DOCUMENTS

| 2010/0113095 | A1 | 5/2010 | Carmon et al. |
| 2012/0269231 | A1 | 10/2012 | Zhang et al. |
| 2012/0328033 | A1 | 12/2012 | Jin et al. |
| 2013/0208769 | A1* | 8/2013 | Carmon ............... H04J 3/0685 375/219 |

(Continued)

FOREIGN PATENT DOCUMENTS

| EP | 1570685 A1 | 9/2005 |
| EP | 2003808 A1 | 12/2008 |
| EP | 2627010 A1 | 8/2013 |

OTHER PUBLICATIONS

International Application # PCT/IB2015/059316 Search Report dated Mar. 20, 2016.

(Continued)

*Primary Examiner* — Rahel Guarino
(74) *Attorney, Agent, or Firm* — D. Kligler IP Services Ltd.

(57) ABSTRACT

An apparatus for wireless communication includes a plurality of antennas, a master baseband integrated circuit (BBIC) and a slave BBIC. The antennas are configured to communicate a Multiple-Input Multiple-Output (MIMO) signal. The master BBIC is configured to process a first component of the MIMO signal that is communicated via a first subset of the antennas. The slave BBIC is configured to process a second component of the MIMO signal that is communicated via a second subset of the antennas. The master BBIC is further configured to control the slave BBIC so as to jointly communicate the MIMO signal, based on the first and second components, via the entire plurality of the antennas.

28 Claims, 3 Drawing Sheets

(56) References Cited

U.S. PATENT DOCUMENTS

| | | | |
|---|---|---|---|
| 2014/0016682 A1* | 1/2014 | Rexberg | H04B 7/0413 375/219 |
| 2014/0036757 A1 | 2/2014 | Kim et al. | |
| 2014/0269358 A1* | 9/2014 | Gao | H04L 43/0888 370/252 |
| 2014/0362936 A1 | 12/2014 | Tang et al. | |

OTHER PUBLICATIONS

IEEE Standard 802.11ac, "IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz", 425 pages, Dec. 11, 2013.

\* cited by examiner

SU-MIMO, MU-MIMO AND BEAMFORMING OPERATIONS USING SYNCHRONIZED WLAN DEVICES

CROSS-REFERENCE TO RELATED APPLICATIONS

This application claims the benefit of U.S. Provisional Patent Application 62/089,267, filed Dec. 9, 2014, whose disclosure is incorporated herein by reference.

FIELD OF THE INVENTION

The present invention relates generally to wireless communication, and particularly to wireless devices having multiple antennas.

BACKGROUND OF THE INVENTION

Some Wireless Local-Area Network (WLAN) configurations use Multi-User Multiple-Input Multiple-Output (MU-MIMO) schemes for communicating with multiple users simultaneously. MU-MIMO operation in WLANs is specified, for example, in the IEEE 802.11ac-2013 standard, entitled "IEEE Standard for Information technology—Local and metropolitan area networks—Specific requirements—Part 11: Wireless LAN Medium Access Control (MAC) and Physical Layer (PHY) Specifications Amendment 4: Enhancements for Very High Throughput for Operation in Bands below 6 GHz," 2013, which is incorporated herein by reference.

SUMMARY OF THE INVENTION

An embodiment of the present invention that is described herein provides an apparatus for wireless communication including a plurality of antennas, a master baseband integrated circuit (BBIC) and a slave BBIC. The antennas are configured to communicate a Multiple-Input Multiple-Output (MIMO) signal. The master BBIC is configured to process a first component of the MIMO signal that is communicated via a first subset of the antennas. The slave BBIC is configured to process a second component of the MIMO signal that is communicated via a second subset of the antennas. The master BBIC is further configured to control the slave BBIC so as to jointly communicate the MIMO signal, based on the first and second components, via the entire plurality of the antennas.

In some embodiments, the master BBIC and the slave BBIC are synchronized to a same clock reference. In some embodiments, the MIMO signal includes a Single-User MIMO (SU-MIMO) signal that is exchanged between the apparatus and a single remote device. In other embodiments, the MIMO signal includes a Multi-User MIMO (MU-MIMO) signal that is exchanged between the apparatus and a multiple remote devices.

In some embodiments, the master BBIC and the slave BBIC are configured to jointly transmit the MIMO signal using a beamforming or spatial expansion matrix that spans the entire plurality of the antennas, by: applying a first part of the beamforming or spatial expansion matrix to the first component of the MIMO signal using the master BBIC; and applying a second part of the beamforming or spatial expansion matrix to the second component of the MIMO signal using the slave BBIC.

In an embodiment, the master BBIC and the slave BBIC are configured to map identical data in parallel onto the first and second subsets of the antennas, respectively, using the first and second parts of the beamforming or spatial expansion matrix. In another embodiment, when the beamforming or spatial expansion matrix includes a beamforming transmission matrix, the master BBIC and the slave BBIC are configured to calculate the first half and the second half, respectively, autonomously without communicating with one another.

In yet another embodiment, when the beamforming or spatial expansion matrix includes a beamforming matrix and the MIMO signal includes multiple sub-carriers, the master BBIC and the slave BBIC are configured to calculate beamforming matrices for first and second subsets of the subcarriers, respectively. In a disclosed embodiment, the master BBIC and the slave BBIC are configured to exchange with one another at least some of the beamforming matrices, so as to reconstruct the first half in the master BBIC and the second half in the slave BBIC.

In some embodiments, the master BBIC is configured to receive the MIMO signal via the first subset of the antennas so as to produce one or more first frames, the slave BBIC is configured to receive the same MIMO signal via the second subset of the antennas so as to produce one or more second frames, and the master and slave BBICs are configured to jointly produce a combined sequence of decoded frames based on the first and second frames.

In some disclosed embodiments, the master BBIC is configured to produce a first bit-map that indicates which of the first frames were decoded successfully, the slave BBIC is configured to produce a second bit-map that indicates which of the second frames were decoded successfully, and the master and slave BBICs are further configured to merge the first and second bit-maps.

The master BBIC may be configured to generate and transmit a block acknowledgement (BA) frame based on the merged first and second bit-maps. In an embodiment, the master and slave BBICs are configured to produce and output the combined sequence of the decoded frames based on the merged first and second bit-maps.

In an example embodiment, the master and slave BBICs are configured to merge the first and second bit-maps by calculating a bit-wise OR between the first and second bit-maps. In a disclosed embodiment, the master and slave BBICs are configured to merge the first and second bit-maps by selecting one of the first and second bit-maps indicating a largest number of successfully-decoded frames.

There is additionally provided, in accordance with an embodiment of the present invention, a method for wireless communication. The method includes, in a wireless device that includes a plurality of antennas for communicating a Multiple-Input Multiple-Output (MIMO) signal, applying a master baseband integrated circuit (BBIC) to process a first component of the MIMO signal that is communicated via a first subset of the antennas. A slave BBIC is applied to process a second component of the MIMO signal that is communicated via a second subset of the antennas. The MIMO signal is jointly communicated, based on the first and second components, via the entire plurality of the antennas.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for implementing MIMO WLAN devices. In the disclosed embodiments, a WLAN device having N antennas is implemented using a pair of mutually-synchronized Baseband Integrated Circuits (BBICs), one BBIC supporting N1 antennas and the other BBIC supporting N2 antennas, N1+N2=N. For the sake of clarity, the embodiments described herein refer mainly to an example WLAN device having eight antennas, which is implemented using two separate BBICs, each supporting four antennas.

In some embodiments, the WLAN device as a whole is configured to communicate, i.e., transmit and/or receive, MIMO signals via a plurality of antennas that is divided into two subsets. The device comprises two BBICs, each BBIC coupled to a respective subset of the antennas via Radio Frequency (RF) circuitry. Each BBIC is configured to process the components of the MIMO signals that are transmitted or received via the respective subset of antennas.

The two BBICs in the WLAN device are synchronized with one another in time and frequency, e.g., by deriving the clock and Local Oscillator (LO) signals of both BBICs from the same clock reference. One of the BBICs is defined as a master and the other is defined as a slave. The master BBIC is configured to control the slave BBIC, so as to jointly transmit and receive the MIMO signals via the entire plurality of the antennas.

Example methods for transmitting and receiving MIMO signals using the disclosed WLAN device configuration are described in detail herein. The disclosed methods address both Physical-Layer (PHY) and Medium Access Control (MAC) operation of the WLAN device.

The methods and systems described herein enable reusing existing BBICs and RF Integrated Circuits (RFICs) for implementing WLAN devices having higher numbers of antennas, with little or no modification. The performance of the disclosed configurations is comparable with that of a BBIC that is specially-designed for the higher number of antennas. Moreover, when using the disclosed configurations, the same BBIC can be used as a modular building block for implementing WLAN devices having different numbers of antennas. As a result, development cost and risk can be significantly reduced.

System Description

Figure 1:
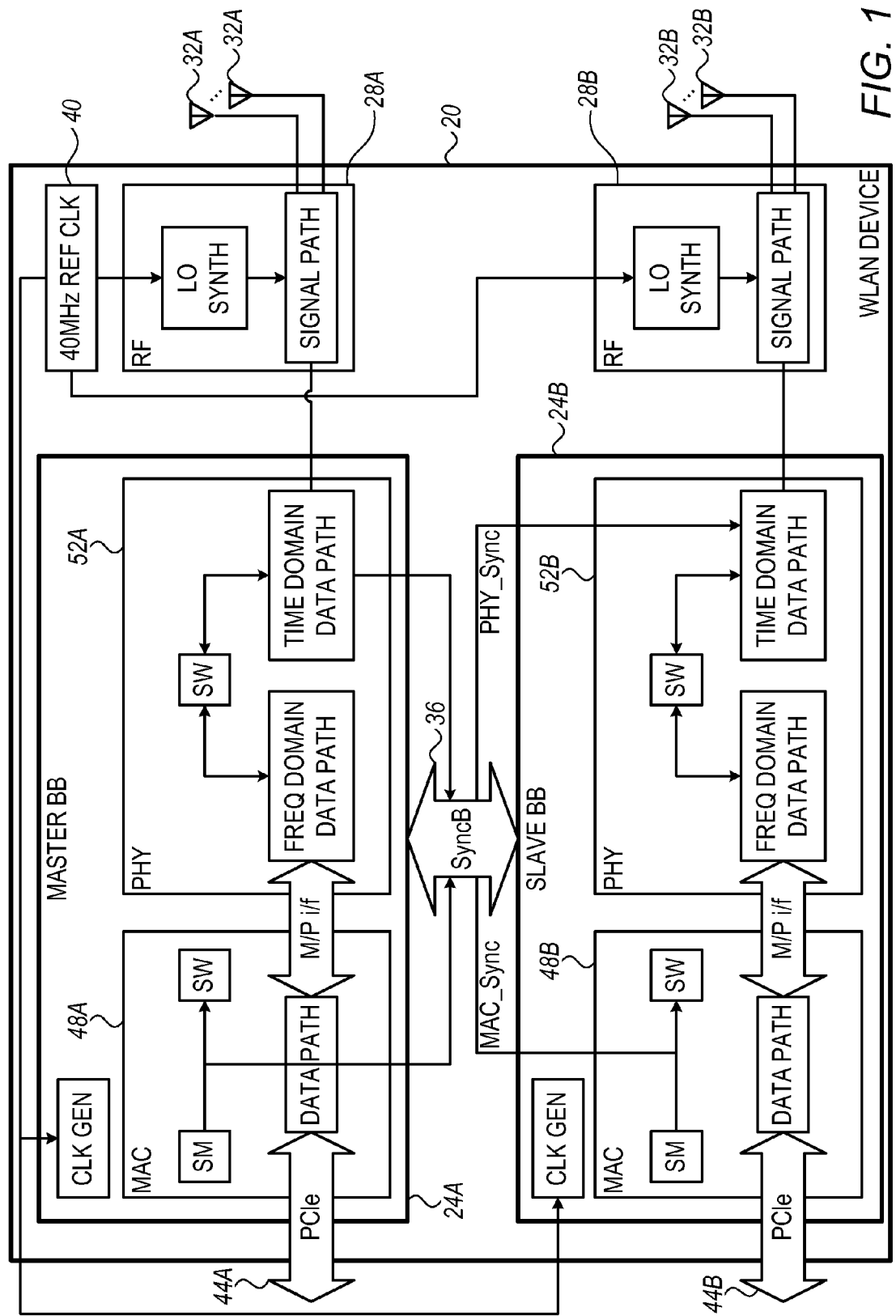
FIG. 1 is a block diagram that schematically illustrates a WLAN device, in accordance with an embodiment of the present invention.

FIG. 1 is a block diagram that schematically illustrates a WLAN device 20, in accordance with an embodiment of the present invention. Device 20 may comprise, for example, a WLAN Access Point (AP), a WLAN station (STA) or any other suitable type of WLAN device. In the present example, although not necessarily, device 20 operates in accordance with the IEEE 802.11ac-2013 standard, cited above.

In the embodiment of FIG. 1, device 20 comprises BBICs 24A and 24B, connected respectively to antenna subsets 32A and 32B via RF modules 28A and 32B. In one embodiment, the total number of antennas 32 is eight, with one subset comprising four antennas 32A and the other subset comprising four antennas 32B. Without loss of generality, BBIC 24A is defined as a master BBIC, and BBIC 24B is defined as a slave BBIC. In an embodiment, BBICs 24A and 24B are identical ICs, and each of them is configured at system initialization to serve as a master or as a slave.

The two BBICs communicate with one another via an interface 36 denoted SyncB. Interface 36 may comprise, for example, one or more General-Purpose Input-Output (GPIO) signals having a clock rate on the order of several tens of MHz, e.g., 40 MHz. This clock rate enables direct connection between the two BBICs. Note that the internal clock rates in the BBICs may be considerably higher.

Device 20 further comprises a reference clock source 40, e.g., a 40 MHz clock source. The clock signal generated by this reference clock is used for deriving the clock signals and Local Oscillator (LO) signals of BBICs 24A and 24B and RF modules 28A and 28B. In the present example, each BBIC comprises clock generation circuitry that generates the appropriate clock signal or signals from the reference clock signal. Each RF module comprises a LO synthesizer that generates the appropriate clock signal or signals from the reference clock signal.

Thus, the various digital clocks (e.g., digital-to-analog and analog-to-digital sampling clocks) and analog frequency signals (e.g., LO signals for up-conversion and down-conversion of signals) in device 20 are synchronized to the same reference clock signal. In alternative embodiments, one BBIC may receive the reference clock signal from an external source, and provide a buffered clock signal derived from the reference clock signal to the other BBIC. In some embodiments, for signals that pass between the BBICs, the BBICs comprise synchronization circuitry that translates the signals from the clock domain of one BBIC to the clock domain of the other.

Due to this synchronization, there are virtually no frequency or timing errors between BBICs 24A and 24B and between RF modules 28A and 28B. The LO signals in the RF modules 28A and 28B are coherent, up to a residual phase error caused by the phase noise of the different synthesizers. This phase error is typically tolerable and causes little or no performance degradation. The time and frequency synchronization enables device 20, for example, to transmit a coherent MIMO signal via the entire set of antennas (32A and 32B), even though the signal components transmitted via the two subsets of antennas are generated by two different BBICs.

In the present example, BBICs 24A and 24B comprise respective MAC modules 48A and 48B, and respective PHY modules 52A and 52B. On transmission, the BBICs obtain data for transmission from a host (not shown) over respective Peripheral Component Interconnect Express (PCIe) interfaces. The data is processed in each MAC module by a datapath that is controlled by a state machine (SM) and software (SW). The output of the datapath is provided to the respective PHY module over a respective MAC/PHY interface (M/P i/f). Each PHY module typically comprises a frequency-domain datapath and a time-domain datapath. The baseband signal at the output of each PHY module is converted into an analog baseband signal and provided to the respective RF module. Each RF module has a signalpath that up-converts the signal into RF by mixing the signal with a suitable LO signal generated by the LO synthesizer, and transmits the signal via the respective subset of antennas. A detailed transmission flow is described in FIG. 2 below.

On reception, RF modules 28A and 28B receive RF signals via the respective antenna subsets 32A and 32B. The signalpath in each RF module down-converts the received RF signal to baseband by mixing the RF signal with a suitable LO signal generated by the synthesizer, and delivers the resulting baseband signal to the respective BBIC. In each BBIC, the PHY and MAC modules process the received signals, and the data extracted therefrom is provided to the host via PCIe interface. A detailed reception flow is described in FIG. 3 below.

The configuration of WLAN device 20 shown in FIG. 1 is an example configuration, which is chosen purely for the sake of conceptual clarity. In alternative embodiments, any other suitable device configuration can be used. For example, device 20 may comprise any suitable number of antennas in subset 32A and in subset 32B. The number of antennas need not be the same in both subsets. As another example, the disclosed techniques can be implemented using a larger number of BBICs and a larger number of antenna subsets, not necessarily two. The division of functions among the RF modules, BBIC, and within each of the BBICs and RF modules, may differ from the partitioning shown in FIG. 1. As yet another example, the type of interface between the BBICs and the host is not limited to PCIe, and may comprise any other suitable interface such as Universal Serial Bus (USB).

The different elements of WLAN device 20 may be implemented using suitable hardware, such as in one or more RFICs, Application-Specific Integrated Circuits (ASICs) or Field-Programmable Gate Arrays (FPGAs). In some embodiments, some elements of device 20, e.g., some elements of MAC modules 48A and 48B and PHY modules 52A and 52B, can be implemented using software, or using a combination of hardware and software elements. Elements of device 20 that are not mandatory for understanding of the disclosed techniques have been omitted from the figure for the sake of clarity.

Some elements of device 20 may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Transmission Operation—Transmitting a MIMO Signal Using Synchronized BBIC'S

In some embodiments, device 20 transmits a beamformed MIMO signal via antennas 32A and 32B. Master BBIC 24A generates the component of the beamformed signal transmitted via the four antennas 32A, while slave BBIC 24B generates the component of the beamformed signal transmitted via the four antennas 32B. Due to the synchronization between the two BBICs and between the two RF modules, the two components of the signal are transmitted coherently, so as to jointly transmit the desired MIMO signal via the entire set of eight antennas.

In these embodiments, BBICs 24A and 24B receives the same data in parallel from the host, and each BBIC generates the respective component of the MIMO signal from this data, including beamforming. The maximum number of parallel spatial streams (spatial layers) supported by device 20 is thus equal to the number of antennas supported by the BBIC having the smallest number of antennas, in the present example four.

Figure 2:
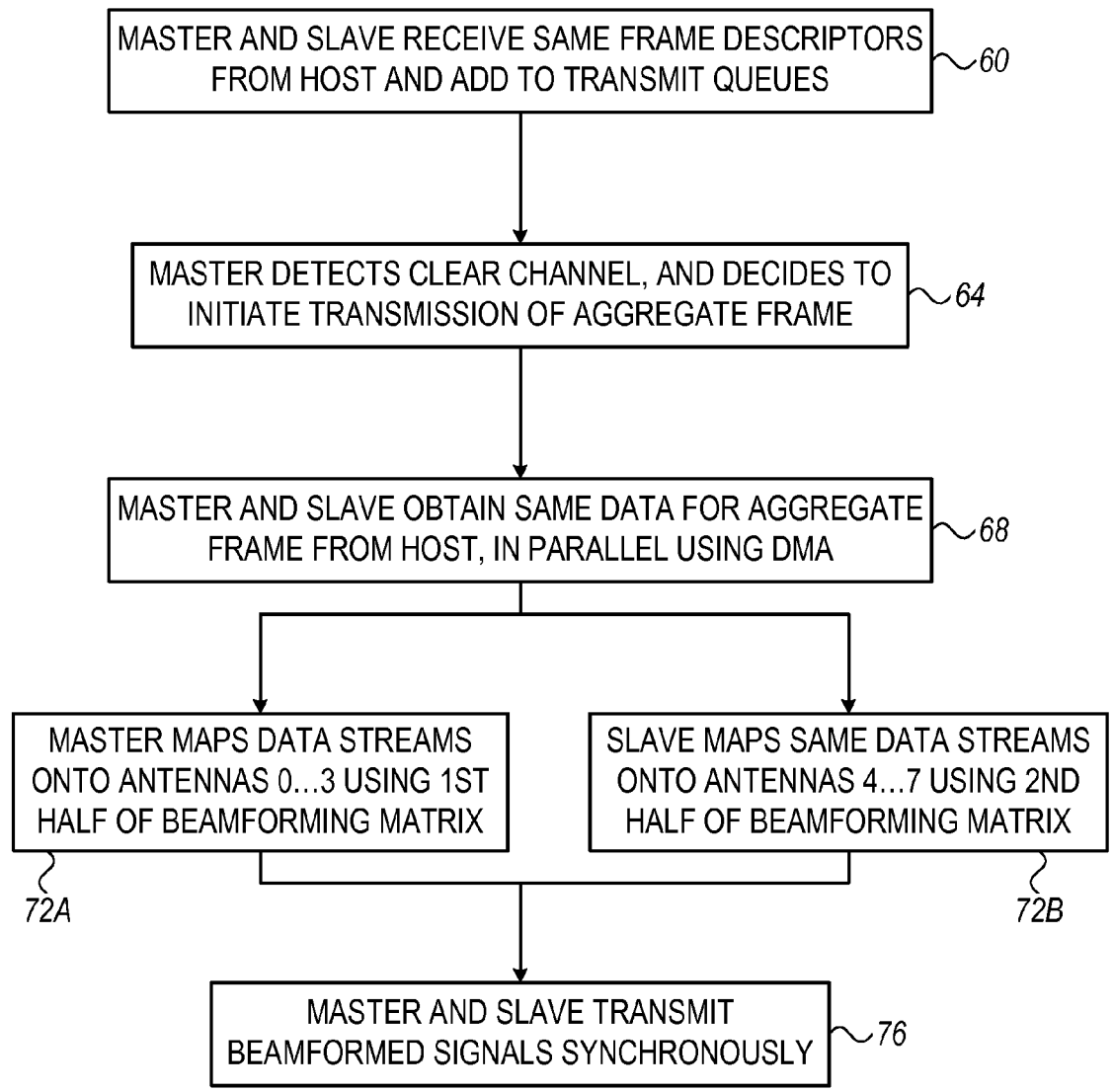
FIG. 2 is a flow chart that schematically illustrates a method for MIMO transmission in the WLAN device of FIG. 1, in accordance with an embodiment of the present invention.

FIG. 2 is a flow chart that schematically illustrates a method for MIMO transmission in WLAN device 20, in accordance with an embodiment of the present invention. The method begins with the MAC modules of the master and slave BBICs receiving frame descriptors from the host, at a descriptor input step 60. In the present example, each frame descriptor specifies a data frame to be transmitted, in accordance with the IEEE 802.11ac specification. Each frame descriptor typically specifies the attributes of the frame, and the location in the host memory in which the data of the frame is stored. Typically, the host sends a frame descriptor to device 20 whenever the host has a new frame to transmit.

Both BBICs 24A and 24B receive the same set of frame descriptors via the respective PCIe interfaces 44A and 44B. The MAC module in each BBIC maintains a Transmit Queue (TQ) per each remote device that device 20 communicates with. The MAC module in each BBIC adds each frame descriptor to the appropriate TQ. Thus, at any given time, BBICs 24A and 24B hold the same set of TQs that hold the same set of frame descriptors.

At a Clear Channel Assessment (CCA) step 64, the master BBIC detects that the communication channel is clear, and initiates transmission of a frame or an aggregate frame, as specified in IEEE 802.11ac. Typically, the PHY module of the master BBIC detects the clear channel and indicates the detection to the MAC module. BBIC 24A typically notifies BBIC 24B of the decision to initiate an aggregate frame, via interface 36.

In response to the CCA indication, the MAC modules of the master and slave BBICs obtain the frames to be transmitted in the aggregate frame, at a data input step 68. Typically, the MAC module of the master BBIC decides which frames are to be transmitted in the aggregate frame, and notifies the MAC module of the slave BBIC. Each of the BBICs then initiates transfer of these frames from the host memory over the PCIe interfaces using Direct Memory Access (DMA).

MAC modules 48A and 48B of the mater and slave BBICs obtain the same frames in parallel, and transfer the frame data and attributes to their respective PHY modules 52A and 52B. Typically, the PHY module in each BBIC receives, for each frame to be transmitted, the frame data and attributes such as power level and Modulation and Coding Scheme (MCS). Each of the two PHY modules generates the component of the MIMO signal that is to be transmitted via its respective subset of four antennas.

In particular, the MIMO signal as a whole is to be precoded with a certain beamforming matrix. The beamforming matrix is typically of size Nss-by-Nant, wherein Nss denotes the number of spatial streams to be transmitted ($1 \leq Nss \leq 4$ in the present example) and Nant denotes the total number of antennas of device 20 (Nant=8 in the present example).

The elements of the beamforming matrix are typically computed by device 20 based on feedback that is received from the remote device or devices that device 20 communicates with. The feedback frames are referred to as Compressed Beamforming (CBF) frames. Typically, device 20 transmits a sounding frame (referred to as Null Data Packet—NDP), which is used by the remote devices for estimating the channel responses between them and device 20 and for calculating the appropriate feedback.

The beamforming matrix maps each spatial stream onto the eight antennas, so that each spatial stream is directed toward its destination device. When device 20 operates in Single-User MIMO (SU-MIMO) mode, the spatial streams carry different data but are directed toward the same remote device. When device 20 operates in Multi-User MIMO (MU-MIMO), different spatial streams may be directed toward different remote devices.

In some embodiments, PHY modules 52A and 52B calculate the beamforming matrix for a given frame. Each PHY module uses half of the matrix, i.e., a respective Nss-by-Nant/2 sub-matrix, corresponding to its subset of antennas. The sub-matrix used by PHY module 52A of master BBIC 24A comprises half of the columns of the beamforming matrix, for mapping the Nss spatial stream onto the four antennas 32A. The sub-matrix used by PHY module 52B of slave BBIC 24B comprises the other half of the columns of the beamforming matrix, for mapping the Nss spatial stream onto the four antennas 32B.

At a master beamforming step 72A, PHY module 52A maps the Nss spatial streams onto the four antennas 32A. In parallel, at a slave beamforming step 72B, PHY module 52B maps the same Nss spatial streams onto the four antennas 32B.

At a transmission step 76, PHY modules 52A and 52B transmit their respective components of the beamformed MIMO signal via RF modules 28A and 28B and antennas 32A and 32B. Since the BBICs and RF modules are synchronized in time and frequency as explained above, the two components of the MIMO signal are transmitted coherently. The end result is a coherent beamformed MIMO signal that is transmitted jointly via the entire set of eight antennas of device 20.

The example above refers to transmission of a directional beamformed signal. In alternative embodiments, the method of FIG. 2 can be used for transmitting non-beamformed MIMO signals, as well. In these embodiments, a spatial expansion matrix is used instead of a beamforming matrix. The spatial expansion matrix is used for mapping the Nss spatial streams onto the Nant antennas (but without forming a directional antenna pattern), and has the same dimensions as the beamforming matrix.

Similarly to the beamforming process of steps 72A and 72B, PHY modules 52A and 52B typically map the same Nss spatial streams onto antennas 32A and 32B, respectively. Each PHY module maps the spatial streams using a respective Nss-by-Nant/2 sub-matrix of the spatial expansion matrix. Unlike the beamforming matrix, the spatial expansion matrix is typically predefined and not calculated adaptively. Thus, each BBIC may be pre-configured in advance with the appropriate Nss-by-Nant/2 sub-matrix.

As noted above, the method of FIG. 2 can be used for SU-MIMO and/or MU-MIMO transmissions.

Typically, PHY modules 52A and 52B are required to keep the delay of start of frame transmission small and consistent, e.g., no more than one or two samples. This requirement is important, for example, for maintaining phase coherence, and to maintain a constant delay between transmission of a sounding frame (NDP) and transmission of a frame whose beamforming matrix was calculated based on this sounding frame. This requirement is also important for increasing the effective channel dispersion matrix.

In some embodiments, device 20 achieves this synchronization by sending a synchronization pulse denoted PHY_TX_Sync from master BBIC 24A to slave BBIC 24B over interface 36. The pulse is typically sent slightly before the start of frame transmission in the master BBIC, so that both BBICs will start frame transmission simultaneously (up to 1-2 samples) taking into account the propagation delay of the synchronization pulse over interface 36 and the logic in the master and slave BBICs.

In some embodiments, some functions of PHY modules 52A and 52B may be implemented in firmware having a varying delay, e.g., varying interrupt latency. In such implementations, the delay between transmission request by the MAC module and actual start of transmission by the PHY module may vary by several samples or even more. This feature should be considered when implementing the PHY_TX_Sync synchronization mechanism to achieve the desired accuracy.

In some legacy frame transmission schemes, and during the legacy part of the preamble in a High Throughput (HT) or Very High Throughput (VHT) frame, different cyclic rotations are applied to the signal for different antenna indices. In some embodiments, device 20 may perform these rotations by allocating half of the antenna indices to each BBIC, e.g., allocating indices 0 . . . 3 to the master BBIC and indices 4 . . . 7 to the slave BBIC. With these allocations, each BBIC is able to perform the appropriate cyclic rotations. The antenna-index allocations to the BBICs can be used for any other suitable operation that is antenna specific.

Reception Operation—Receiving a MIMO Signal Using Synchronized BBIC'S

In some embodiments, device 20 receives a beamformed MIMO signal via antennas 32A and 32B. Unlike the transmission process described above, on reception each BBIC typically receives and demodulates the MIMO signal independently of the other BBIC. This solution is chosen because full joint MIMO reception by the two BBICs is computationally complex and involves transfer of large data volumes over interface 36.

In the present example, the two BBICs receive the same MIMO signal, which carries up to four spatial streams, and each BBIC decodes the signal independently. Since each BBIC receives the signal via a different set of antennas (and thus via a different set of channels), various kinds of receive-diversity can be implemented.

Figure 3:
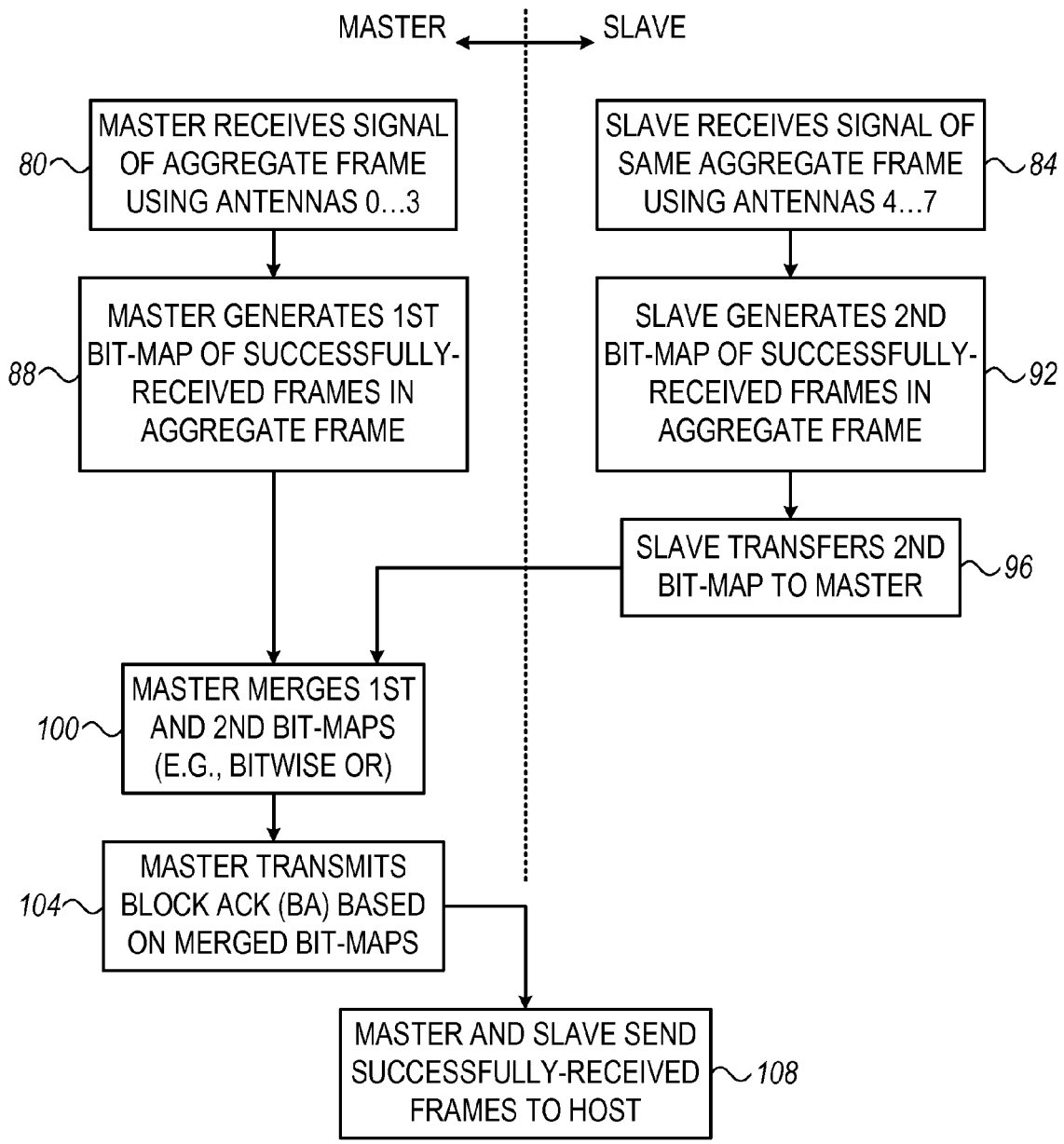
FIG. 3 is a flow chart that schematically illustrates a method for MIMO reception in the WLAN device of FIG. 1, in accordance with an embodiment of the present invention.

In the embodiment of FIG. 3, the received signal carries an aggregate frame that comprises multiple frames. In accordance with the IEEE 802.11ac specification, device 20 decodes the frames of the aggregate frame, and then transmits a Block Acknowledgement (BA) indicating which of the frames was received successfully. The remote devices respond to the BA by retransmitting the frames that device 20 failed to receive.

FIG. 3 is a flow chart that schematically illustrates a method for MIMO reception in WLAN device 20, in accordance with an embodiment of the present invention. The method begins with master BBIC 24A receiving a MIMO signal via antennas 32A, at a master reception step 80. At the same time, slave BBIC 24B receives the same MIMO signal via antennas 32B, at a slave reception step 84.

Each of BBICs 24A and 24B receives and decodes the frames of the aggregate frame independently of one another, at a master decoding step 88 and a slave decoding step 92, respectively. As part of the decoding process, each BBIC generates a respective bit-map that indicates the successfully decoded frames. Typically, the bit-map comprises a respective bit for each frame in the aggregate frame. A "1" bit value indicates that the frame was decoded successfully, and a "0" bit value indicates that the BBIC failed to decode the frame. Each BBIC typically regards a frame as received successfully if its Cyclic Redundancy Check (CRC) was decoded successfully.

Since the two BBICs decode the frames independently of one another, one BBIC may decode a given frame successfully while the other BBIC may fail to decode the same frame. Thus, the two bit-maps generated by BBICs 24A and 24B may be different, even though they both pertain to the same set of frames.

At a bit-map transfer step 96, slave BBIC 24B sends the bit-map it has generated to master BBIC 24A over interface 36. The master BBIC merges the bit-map it received from the slave BBIC with the bit-map it has generated itself, at a merging step 100. Typically, the master BBIC generates the merged bit-map by performing bit-wise OR between its own bit-map and the bit-map received from the slave BBIC.

In the merged bit-map, a "1" bit value indicates a frame that was received successfully by at least one of the BBICs. A "0" bit value indicates a frame that both BBICs failed to receive, and therefore needs to be retransmitted. At a BA transmission step 104, the master BBIC transmits a Block Acknowledgement (BA) based on the merged bit-map. It is typically sufficient to transmit the BA using only four antennas (antennas 32A), since BA frames are typically transmitted using low (robust) MCS.

The maximal aggregate frame size specified in IEEE 802.11ac has sixty-four frames, and the maximal bit-map size is therefore eight bytes. A bit-map of this size can be transferred from the slave BBIC to the master BBIC over interface 36 with very small latency. This latency is important, for example, because the master BBIC should transmit the BA within a short time (e.g., 16 µS) after receiving the aggregate frame.

At a host transfer step 108, device 20 reports the frame descriptors of the successfully-decoded frames to the host over the PCIe interface. In response, the host will typically retrieve the successfully-decoded frames using DMA. In various embodiments, reporting may be performed by the master and/or slave BBIC. Two factors should be considered—(i) Different frames may have been decoded successfully by different BBICs, and (ii) The host should typically receive the frame descriptors in order.

In one embodiment, reordering and reporting the frame descriptors is performed by the master BBIC. This implementation involves more traffic on interface 36. In another embodiment, the master and slave BBICs each report frame descriptors independently to the host. In this embodiment, the host should perform the reordering. In the latter embodiment, the master typically notifies the slave BBIC which range of descriptors (e.g., up to which serial number) should be reported to the host. The master and slave BBICs may coordinate the reporting between them, so that the slave BBIC does not report frame descriptors that are also reported by the master BBIC (for frames that were decoded successfully by both BBICs). For example, the master BBIC may send the merged bit-map to the slave BBIC. The slave BBIC may use the merged bit-map to identify which frames were decoded successfully (and reported) by the master BBIC, and refrain from reporting their descriptors.

In some embodiments, the scheme of FIG. 3 can be simplified by assuming that one BBIC receives the signal with improved quality relative to the other BBIC. In such cases, the contribution of the bit-map of the other BBIC to overall successful decoding is small. Therefore, instead of merging the bit-maps generated by the two BBICs, it is possible in some cases to select the bit-map of the BBIC that enjoys the improved reception quality.

In an example embodiment, each BBIC notifies the peer BBIC of the number of frames it was able to decode successfully in the aggregate frame. The BBIC that successfully decoded a larger number of frames is assumed to have received the MIMO signal with better quality (e.g., better link budget) than the other BBIC. The BBIC having the improved reception quality generates and transmits the BA based only on its own bit-map, and also reports the frame descriptors of the successfully-decoded frames to the host. The other BBIC refrains from performing these tasks. The BBIC having the improved reception quality typically instructs the other BBIC to drop the reported frames from its BA window reception queue. In this scheme, no reordering of frame descriptors is needed, since all reporting is performed by the same BBIC.

In the opposite direction, both BBIC typically receive BA frames and compressed beamforming report frames from remote devices. These frames are usually sent with low MCS, meaning their reception is robust and will usually be successful in both BBICs. The information in these two frame types are typically used by the two BBICs without a need for coordination or information transfer between the BBICs over interface 36. The usage of these frames is described in greater detail further below.

The description above referred to reception of an aggregate frame that comprises multiple frames. The disclosed techniques, however, are not limited to aggregate frames and can be used for reception of individual frames as well. In such an embodiment, each BBIC generates a single bit that indicates success or failure in decoding the frame, instead of a bit-map. The master BBIC combines (e.g., ORs) the two bits to generate an acknowledgement or negative acknowledgement for the frame, instead of a BA.

MAC Operation Aspects

In some embodiments, MAC decisions in device 20 are performed by MAC module 48A in master BBIC 24A. MAC decisions comprise, for example, decisions to start transmission, selection of transmission attributes for the transmit vectors of the frames to be transmitted, channel access decisions such as back-off, management of the reception and/or transmission state machine, and/or any other suitable decision relating to the MAC layer. The corresponding functions in the slave BBIC are typically disabled and bypassed, and the decisions made by the master BBIC are reported to the slave BBIC over interface 36.

As explained above, the master and slave BBICs continuously maintain identical duplicate sets of TQs that hold the same frame descriptors. Generally, the contents of the TQs are affected by two types of events, referred to as input events and output event.

An input event involves addition of a new frame descriptor into a TQ. An input event occurs whenever the host sends a new frame descriptor over the PCIe interface. In some embodiments, the host sends each frame descriptor to both BBICs 24A and 24B, over PCIe interfaces 44A and 44B.

An output event involves removing the frame descriptors of successfully-decoded frames from the TQs, in response to a BA frame received from a remote device. Since the BA frame is received independently in both the master and the slave BBICs, both BBICs can remove the appropriate frame descriptors from their respective TQs without a need for any coordination over interface 36. In some rare cases, one of the BBICs may fail to receive a BA frame correctly. In such a case, this BBIC may request the other BBIC for the BA bit-map over interface 36.

By handling the input and output events in this manner, the TQs and their contents are kept identical in BBICs 24A and 24B at all times.

In some embodiments, upon making a decision to start transmission of a frame, the master BBIC communicates the transmit vector parameters (the frame attributes) to the slave BBIC over interface 36. The reported parameters typically comprise a pointer to the relevant TQ (or TQs in case of MU-MIMO), as well as the number of frames destined to each remote device in the aggregate frame. Since both BBICs have the same TQ content at all times, both BBICs can start DMA retrieval of the packet data from the host memory. The DMA operation can start simultaneously in both BBICs, after the transmit vector is reported from the master BBIC to the slave BBIC.

In an alternative embodiment, only the master BBIC has PCIe access to the host. An additional PCIe interface connects the master BBIC to the slave BBIC, and the master BBIC forwards frames to the slave BBIC over the latter interface. This alternative implementation relieves the host of the need to send each frame twice (to the two BBICs), but is typically more complex to implement and incurs higher latency.

In a typical implementation, different transmission parameters may become known to the master BBIC at different times and/or in response to different events. For example, the transmit decision is typically available in the master BBIC approximately one time slot (9 μS in accordance with IEEE 802.11ac) or half a time slot before the actual start of transmission. The transmission bandwidth may be available at a different time, and the frame length at another time. Some of these parameters become known only after the frame transmission has started. Typically, the master BBIC reports each such event or decision to the slave BBIC immediately as it becomes available.

Calculation of SU-MIMO and MU-MIMO Beamforming Matrices

In accordance with IEEE 802.11ac, the transmitted signal is an Orthogonal Frequency Division Multiplexing (OFDM) signal that comprises multiple sub-carriers in respective frequency bins, and beamforming matrices are defined per sub-carrier. The beamforming matrices are based on CBF feedback frames received from the remote device or devices.

As explained above, in beamforming operations each of BBICs 24A and 24B in device 20 uses half of the overall beamforming matrix. Since both BBICs receive the same CBF frames during the sounding exchange, each BBIC is able to calculate its half of the beamforming matrix autonomously, without a need to communicate with the other BBIC.

For example, in SU-MIMO operation, the remote device typically estimates the MIMO channel matrix based on the received NDP, and then applies Singular Value Decomposition (SVD) to the channel matrix, so as to produce a beamforming matrix denoted V. The remote device sends matrix V, possibly in compressed form, as feedback. In some embodiments, the two BBICs in device 20 receive matrix V, and each BBIC extracts the Nss-by-Nant/2 sub-matrix of V that corresponds to its antennas. The BBICs use these sub-matrices for beamforming (steps 72A and 72B of FIG. 2). This entire process can be performed without coordination or communication between the BBICs.

In MU-MIMO operation, the V matrices fed-back by the remote devices participating in the MU-MIMO transmission should be pre-processed to generate a single transmit beamforming matrix. This computation is performed per OFDM sub-carrier. The computation of the 4-by-8 (Nss-by-Nant) beamforming matrix is typically much more complex than the computation in the case of a 4-by-4 system (and by more than a factor of two, the ratio between the number of antennas in the two systems).

In some embodiments, since both the master BBIC and the slave BBIC are configured to perform matrix calculations, the MU-MIMO beamforming matrix computations are split between them in order to minimize the overall latency. It can be shown that assigning each BBIC to compute the half of the beamforming matrix corresponding to its subset of antennas is inefficient. In an embodiment, a more efficient split is used, in which each BBIC calculates the full dimensionality beamforming matrix (for all eight antennas), but for half of the sub-carriers.

Thus, each BBICs calculates its assigned matrices and sends to the peer BBIC half of the matrices it has calculated, the half that corresponds to the antenna subset of the peer BBIC. The transaction is performed over interface 36. This transaction involves transferring a large volume of data, and therefore may incur considerable latency. Typically, MU-MIMO transmission can only begin after the exchange above is completed, and it is therefore important to reduce its latency as much as possible.

In one example embodiment, half of the beamforming matrix (corresponding to four spatial streams and four antennas out of eight) amounts to 8 Kbytes of data. Assuming interface 36 has a clock rate of 40 MHz and is 8-bit wide, half a matrix can be exchanged within 0.2 ms, and a two way exchange will require 0.4 ms. Depending on the specific system design (e.g., computational strength and interface bandwidth), it is possible to decide which option has smaller latency ((i) each BBIC calculates full-dimensionality beamforming matrices for half the sub-carriers and exchanges information with its peer, or (ii) each BBIC autonomously calculates reduced-dimensionality beamforming matrices relevant to its subset of antennas, but for all sub-carriers).

In yet another embodiment, the BBICs exchange beamforming matrices over PCIe interfaces 44A and 44B, through the host. The PCIe interface typically has a much larger bandwidth than interface 36, although it often incurs large latency at the beginning of the transaction. In this embodiment, each BBIC may use DMA to transfer the beamforming matrices to the host memory through the PCIe interface. Each BBIC notifies the peer BBIC over interface 36 once the matrices are ready. The peer BBIC then uses DMA to retrieve the matrices from the host over its own PCIe interface.

In some embodiments, each BBIC and respective RF module communicate over a different frequency band. For example, in a "80+80" mode, master BBIC 24A transmits and receives via antennas 32A over a certain 80 MHz band, and slave BBIC 24B transmits and receives via antennas 32B over a different (typically adjacent) 80 MHz band. In an embodiment, the sounding exchange and the resulting CBF feedback frames produce feedback for the entire 160 MHz bandwidth. Each BBIC can autonomously calculate its Nss-by-Nant/2 beamforming matrix from the received CBF frames. In this embodiment, each BBIC calculates beamforming matrices for the sub-carriers falling in its 80 MHz band. Alternatively, each BBIC can sound the channel separately using its subset of four antennas, and thus receive from the remote users only the part of the precoding matrix relevant to its antennas.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for wireless communication, comprising:
   a plurality of antennas, configured to communicate a Multiple-Input Multiple-Output (MIMO) signal;
   a master baseband integrated circuit (BBIC), which is configured to process a first component of the MIMO signal that is communicated via a first subset of the plurality of the antennas; and
   a slave BBIC, which is configured to process a second component of the MIMO signal that is communicated via a second subset of the plurality of the antennas,
   wherein the master BBIC is further configured to control the slave BBIC so as to jointly communicate the MIMO signal, based on the first and second components, via the entire plurality of the antennas,
   and wherein the master BBIC and the slave BBIC are configured to jointly transmit the MIMO signal using a beamforming or spatial expansion matrix that spans the entire plurality of the antennas, by:
      applying a first part of the beamforming or spatial expansion matrix to the first component of the MIMO signal using the master BBIC; and
      applying a second part of the beamforming or spatial expansion matrix to the second component of the MIMO signal using the slave BBIC.

2. The apparatus according to claim 1, wherein the master BBIC and the slave BBIC are synchronized to a same clock reference.

3. The apparatus according to claim 1, wherein the MIMO signal comprises a Single-User MIMO (SU-MIMO) signal that is exchanged between the apparatus and a single remote device.

4. The apparatus according to claim 1, wherein the MIMO signal comprises a Multi-User MIMO (MU-MIMO) signal that is exchanged between the apparatus and a multiple remote devices.

5. The apparatus according to claim 1, wherein the master BBIC and the slave BBIC are configured to map identical data in parallel onto the first and second subsets of the plurality of the antennas, respectively, using the first and second parts of the beamforming or spatial expansion matrix.

6. The apparatus according to claim 1, wherein, when the beamforming or spatial expansion matrix comprises a beamforming transmission matrix, the master BBIC and the slave BBIC are configured to calculate the first part and the second part, respectively, autonomously without communicating with one another.

7. The apparatus according to claim 1, wherein, when the beamforming or spatial expansion matrix comprises a beamforming matrix and the MIMO signal comprises multiple sub-carriers, the master BBIC and the slave BBIC are configured to calculate beamforming matrices for first and second subsets of the multiple subcarriers, respectively.

8. The apparatus according to claim 7, wherein the master BBIC and the slave BBIC are configured to exchange with one another at least some of the beamforming matrices, so as to reconstruct the first part in the master BBIC and the second part in the slave BBIC.

9. An apparatus for wireless communication, comprising:
   a plurality of antennas, configured to receive a Multiple-Input Multiple-Output (MIMO) signal;
   a master baseband integrated circuit (BBIC), which is configured to process a first component of the MIMO signal that is received via a first subset of the plurality of the antennas; and
   a slave BBIC, which is configured to process a second component of the MIMO signal that is received via a second subset of the plurality of the antennas,
   wherein the master BBIC is further configured to control the slave BBIC so as to jointly receive the MIMO signal, based on the first and second components, via the entire plurality of the antennas,
   and wherein the master BBIC is configured to receive the MIMO signal via the first subset of the plurality of the antennas so as to produce one or more first frames, wherein the slave BBIC is configured to receive the same MIMO signal via the second subset of the plurality of the antennas so as to produce one or more second frames, and wherein the master and slave BBICs are configured to jointly produce a combined sequence of decoded frames based on the first and second frames.

10. The apparatus according to claim 9, wherein the master BBIC is configured to produce a first bit-map that indicates which of the first frames were decoded successfully, wherein the slave BBIC is configured to produce a second bit-map that indicates which of the second frames were decoded successfully, and wherein the master and slave BBICs are further configured to merge the first and second bit-maps.

11. The apparatus according to claim 10, wherein the master BBIC is configured to generate and transmit a block acknowledgement (BA) frame based on the merged first and second bit-maps.

12. The apparatus according to claim 10, wherein the master and slave BBICs are configured to produce and output the combined sequence of the decoded frames based on the merged first and second bit-maps.

13. The apparatus according to claim 10, wherein the master and slave BBICs are configured to merge the first and second bit-maps by calculating a bit-wise OR between the first and second bit-maps.

14. The apparatus according to claim 10, wherein the master and slave BBICs are configured to merge the first and second bit-maps by selecting one of the first and second bit-maps indicating a largest number of successfully-decoded frames.

15. A method for wireless communication, comprising:
   in a wireless device that comprises a plurality of antennas for communicating a Multiple-Input Multiple-Output (MIMO) signal, applying a master baseband integrated circuit (BBIC) to process a first component of the MIMO signal that is communicated via a first subset of the plurality of the antennas;
   applying a slave BBIC to process a second component of the MIMO signal that is communicated via a second subset of the plurality of the antennas; and
   jointly communicating the MIMO signal, based on the first and second components, via the entire plurality of the antennas,
   wherein applying the master and slave BBICs comprises jointly generating the MIMO signal by the master BBIC and the slave BBIC using a beamforming or spatial expansion matrix that spans the entire plurality of the antennas, by:
applying a first part of the beamforming or spatial expansion matrix to the first component of the MIMO signal using the master BBIC; and
applying a second part of the beamforming or spatial expansion matrix to the second component of the MIMO signal using the slave BBIC.

16. The method according to claim 15, and comprising synchronizing the master BBIC and the slave BBIC a same clock reference.

17. The method according to claim 15, wherein the MIMO signal comprises a Single-User MIMO (SU-MIMO) signal that is exchanged between the wireless device and a single remote device.

18. The method according to claim 15, wherein the MIMO signal comprises a Multi-User MIMO (MU-MIMO) signal that is exchanged between the wireless device and a multiple remote devices.

19. The method according to claim 15, wherein applying the first and second parts comprises mapping identical data in parallel onto the first and second subsets of the plurality of the antennas, respectively, using the first and second parts of the beamforming or spatial expansion matrix.

20. The method according to claim 15, wherein, when the beamforming or spatial expansion matrix comprises a beamforming transmission matrix, applying the first and second parts comprises calculating the first part and the second part by the master BBIC and the slave BBIC, respectively, autonomously without communicating with one another.

21. The method according to claim 15, wherein, when the beamforming or spatial expansion matrix comprises a beamforming matrix and the MIMO signal comprises multiple sub-carriers, applying the first and second parts comprises calculating beamforming matrices for first and second subsets of the multiple subcarriers by the master BBIC and the slave BBIC, respectively.

22. The method according to claim 21, and comprising exchanging at least some of the beamforming matrices between the master BBIC and the slave BBIC, so as to reconstruct the first part in the master BBIC and the second part in the slave BBIC.

23. A method for wireless communication, comprising:
in a wireless device that comprises a plurality of antennas for receiving a Multiple-Input Multiple-Output (MIMO) signal, applying a master baseband integrated circuit (BBIC) to process a first component of the MIMO signal that is received via a first subset of the plurality of the antennas;
applying a slave BBIC to process a second component of the MIMO signal that is received via a second subset of the plurality of the antennas; and
jointly receiving the MIMO signal, based on the first and second components, via the entire plurality of the antennas,
wherein applying the master BBIC comprises receiving the MIMO signal by the master BBIC via the first subset of the plurality of the antennas so as to produce one or more first frames, wherein applying the slave BBIC comprises receiving the same MIMO signal by the slave BBIC via the second subset of the plurality of the antennas so as to produce one or more second frames, and wherein jointly communicating the MIMO signal comprises jointly producing a combined sequence of decoded frames based on the first and second frames.

24. The method according to claim 23, wherein jointly producing the combined sequence comprises producing using the master BBIC a first bit-map that indicates which of the first frames were decoded successfully, producing using the slave BBIC a second bit-map that indicates which of the second frames were decoded successfully, and merging the first and second bit-maps.

25. The method according to claim 24, and comprising generating and transmitting a block acknowledgement (BA) frame by the master BBIC, based on the merged first and second bit-maps.

26. The method according to claim 24, wherein jointly producing the combined sequence comprises producing and outputting the combined sequence of the decoded frames based on the merged first and second bit-maps.

27. The method according to claim 24, wherein merging the first and second bit-maps comprises calculating a bit-wise OR between the first and second bit-maps.

28. The method according to claim 24, wherein merging the first and second bit-maps comprises selecting one of the first and second bit-maps indicating a largest number of successfully-decoded frames.

* * * * *